(12) United States Patent
Schuler et al.

(10) Patent No.: US 9,085,718 B2
(45) Date of Patent: Jul. 21, 2015

(54) LUMINESCENT END INDICATING TAPE

(71) Applicant: Performance Indicator, LLC, Lowell, MA (US)

(72) Inventors: Alan N. Schuler, Lexington, MA (US); Edward D. Kingsley, Stow, MA (US); Cliff Parker, New Ipswich, NH (US)

(73) Assignee: PERFORMANCE INDICATOR, LLC, Lowell, MA (US)

( * ) Notice: Subject to any disclaimer, the term of this patent is extended or adjusted under 35 U.S.C. 154(b) by 271 days.

(21) Appl. No.: 13/633,165

(22) Filed: Oct. 2, 2012

(65) Prior Publication Data
US 2014/0041572 A1    Feb. 13, 2014

Related U.S. Application Data

(60) Provisional application No. 61/680,295, filed on Aug. 7, 2012.

(51) Int. Cl.
| | | |
|---|---|---|
| C09J 11/06 | (2006.01) | |
| C09J 7/02 | (2006.01) | |
| B32B 33/00 | (2006.01) | |
| B32B 37/12 | (2006.01) | |

(52) U.S. Cl.
CPC .................. *C09J 11/06* (2013.01); *B32B 33/00* (2013.01); *C09J 7/02* (2013.01); *B32B 37/12* (2013.01); *B32B 2307/422* (2013.01); *Y10T 156/10* (2015.01); *Y10T 428/2852* (2015.01)

(58) Field of Classification Search
CPC ............... C09J 7/02; C09J 11/06; B32B 7/02; B32B 7/04; B32B 7/12; B32B 33/00
USPC .............. 116/200, 201; 33/758; 428/343, 354
See application file for complete search history.

(56) References Cited

U.S. PATENT DOCUMENTS

| | | | |
|---|---|---|---|
| 3,537,578 A | 11/1970 | Figliuzzi | |
| 5,340,629 A | 8/1994 | Rodighiero | |
| 6,416,857 B1 * | 7/2002 | Wright et al. | 428/343 |
| 6,767,628 B1 | 7/2004 | Posa et al. | |
| 7,252,880 B2 | 8/2007 | Posa et al. | |
| 7,517,585 B1 | 4/2009 | Funderburk et al. | |
| 7,615,280 B2 | 11/2009 | Behravesh et al. | |
| 2004/0202812 A1 | 10/2004 | Congard et al. | |
| 2005/0102871 A1 | 5/2005 | Merle et al. | |
| 2007/0209747 A1 | 9/2007 | Merle et al. | |
| 2011/0232560 A1 * | 9/2011 | King et al. | 116/201 |
| 2012/0196121 A1 * | 8/2012 | Schwietz | 428/354 |

FOREIGN PATENT DOCUMENTS

JP    2009046538 A    *    3/2009    ............ C09J 7/02

\* cited by examiner

*Primary Examiner* — R. A. Smith
(74) *Attorney, Agent, or Firm* — Cantor Colburn LLP

(57) ABSTRACT

A luminescent end indicating tape comprising one or more base layers and an adhesive layer is disclosed. The one or more base layers provide support to the adhesive layer, whereas the adhesive layer comprises one or more fluorescent materials that convert at least a portion of incident electromagnetic radiation to a longer output wavelength. The adhesive layer redirects at least a portion of the longer output wavelength to at least an end of the tape, such that the end is illuminated with that of at least a portion of the longer output wavelength upon the tape being exposed to incident electromagnetic radiation. Further disclosed are methods of fabricating and using the luminescent end indicating tape.

27 Claims, 3 Drawing Sheets

LUMINESCENT END INDICATING TAPE

CROSS-REFERENCE TO RELATED APPLICATIONS

This application claims priority to U.S. Provisional Patent Application Ser. No. 61/680,295, filed Aug. 7, 2012, entitled "LUMINESCENT END-EDGE INDICATING TAPE," which is incorporated by reference herein in its entirety for all purposes.

BACKGROUND OF THE INVENTION

These teachings relate generally to fluorescent materials, and more particularly to the preparation and use of one or more fluorescent materials to illuminate at least the end of a tape, such that at least the end may be visually observed and detected.

Recently, the trend in tapes has been to increase the tape's transparency. As tapes become increasingly clear, the ability to observe and detect the end and/or edge(s) of a roll of tape, i.e. where the tape falls back onto itself, when subsequently torn or cut has become significantly more difficult, especially in situations where an applicator or roll holder/cutter is not being used when tearing or cutting the tape.

A number of different approaches were exploited in an attempt to develop a tape in which the tape's end and/or edges could be easily located and detected, e.g. U.S. Pat. No. 3,537,578. This patent teaches the use of a continuous imprinted marking located along the length of the tape, preferably extending diagonally from one end to the other end of the tape, to indicate the free end of the tape. Once this tape is rolled, the free end of the tape is detected as a result of locating the break in the continuous imprinted marking located along the length of the tape. However, this approach relies heavily on the imprinted marking of the tape that detracts from the transparency characteristics of the tape.

U.S. Pat. No. 7,517,585 describes the use of encapsulated chromogenic materials that are incorporated on the support material of the tape to indicate the end of the tape. According to this teaching, upon separation of a desired length of the tape, the capsules or microcapsules containing the chromogenic material(s) are ruptured providing a visible color at the end of the tape, i.e. the tear site. However, the incorporation of the chromogenic materials, that is, the capsules or microcapsules, which is vital to producing the visibility of the end of the tape, substantially reduces the transparency of the tape.

In the past, there have been attempts in utilizing fluorescent materials within the tape to detect the tape's end, e.g., U.S. Pat. Nos. 6,767,628 and 7,252,880. However, even though, the technology described in these patents employ the use of fluorescent materials, such technology disadvantageously incorporates the fluorescent materials into the base layer of the tape. As tapes are constructed on many different thicknesses of base layer(s), dependent on the tape's use, these patent teachings would require the making and inventorying of numerous types of base layer(s) with varying thicknesses and colors. Furthermore, applicable base layer(s) for such technology would not be of standard production as opposed to a clear base layer, and would evidently require additional time and cost during manufacturing.

Given the recent trend toward increasing the transparency of a tape, as well as the limitations of existing methods of detecting the end and/or edge(s) of tape, there is a need for an end indicating tape that does not substantially take away from the transparency characteristics of the tape. There is a further need for an end indicating tape that requires fewer restrictions in its construction, such that many different colors and thicknesses of the tape may be produced without incurring additional time and cost, as with the current prior art.

BRIEF SUMMARY OF THE INVENTION

The present teachings provide for a luminescent end indicating tape. The luminescent end indicating tape comprises one or more base layers and an adhesive layer. The one or more base layers provide support to the adhesive layer. The adhesive layer comprises one or more fluorescent materials that convert at least a portion of incident electromagnetic radiation to a longer output wavelength. The adhesive layer redirects at least a portion of the longer output wavelength to at least an end of the tape, such that the end is illuminated with that of at least a portion of the longer output wavelength upon the tape being exposed to incident electromagnetic radiation. In some constructions, the one or more base layers may be substantially transparent. In other constructions the adhesive layer may be substantially transparent. In one aspect, the one or more base layers may have a refractive index that is substantially equal to the refractive index of the adhesive layer, such that the one or more base layers additionally redirect at least a portion of the longer output wavelength to at least the end of the tape. In another aspect, the one or more base layers may have an optical transmission of at least equal to about 90 percent. In a further aspect, the adhesive layer may have an optical transmission of at least equal to about 90 percent. In some instances, the adhesive layer of the tape may have refractive index of at least equal to about 1.3. In other instances, the adhesive layer may further redirect at least a portion of the longer output wavelength to one or more edges of the tape, such that the one or more edges are additionally illuminated with that of at least a portion of the longer output wavelength upon the tape being exposed to incident electromagnetic radiation. In another instance, the luminescent end indicating tape may further comprise another adhesive layer having a refractive index substantially equal to the refractive index of the adhesive layer, such that the another adhesive layer redirects at least a portion of the longer output wavelength to at least the end of tape. In a further instance, the another adhesive layer may comprise another one or more fluorescent materials that convert at least a portion of incident electromagnetic radiation to the longer output wavelength.

The present teachings also provide for a method for fabricating a luminescent end indicating tape. The method of the present teachings comprises providing one or more base layers and overlaying an adhesive layer over one side of the one or more base layers. The one or more base layers provide support to the adhesive layer. The adhesive layer comprises one or more fluorescent materials that convert at least a portion of incident electromagnetic radiation to a longer output wavelength. The adhesive layer redirects at least a portion of the longer output wavelength to at least an end of the tape, such that the end is illuminated with that of at least a portion of the longer output wavelength upon the tape being exposed to incident electromagnetic radiation. In some constructions, the one or more base layers may have a refractive index substantially equal to the refractive index of the adhesive layer, such that the one or more base layers additionally redirect at least a portion of the longer output wavelength to at least the end of the tape. In other constructions, the one or more base layers may have an optical transmission of at least equal to about 90 percent. In another aspect, the adhesive layer may have an optical transmission of at least equal to about 90 percent. In yet another aspect, the adhesive layer may have a refractive index of at least equal to about 1.3. In other instances, the adhesive layer may further redirect at least a portion of the longer output wavelength to one or more edges of the tape, such that the one or more edges are additionally illuminated with that of at least a portion of the longer output wavelength upon the tape being exposed to incident electromagnetic radiation. The method of the present teachings may further comprise disposing another adhesive layer onto another side of the one or more base layers. In this instance, the another adhesive layer having a refractive index substantially equal to the refractive index of said adhesive layer, redirects at least a portion of the longer output wavelength to at least the end of the tape. In a further aspect, the another adhesive layer may comprise another one or more fluorescent materials that convert at least a portion of incident electromagnetic radiation to the longer output wavelength.

The present teachings further provide for a method for identifying at least an end of a tape. The method comprises providing a luminescent end indicating tape that comprises one or more base layers and an adhesive layer. The one or more base layers provide support to the adhesive layer. The adhesive layer comprises one or more fluorescent materials that convert at least a portion of incident electromagnetic radiation to a longer output wavelength. The luminescent end indicating tape is subsequently exposed to incident electromagnetic radiation and the adhesive layer redirects at least a portion of the longer output wavelength to at least the end of the luminescent end indicating tape, such that at least a portion of the end of the luminescent end indicating tape is detected. In some constructions, the adhesive layer may further redirect at least a portion of the longer output wavelength to one or more edges of the luminescent end indicating tape, such that when the luminescent end indicating tape is subsequently exposed to incident electromagnetic radiation, at least a portion of the one or more edges are additionally illuminated with that of the longer output wavelength and detected. In other constructions, the one or more base layers may have a refractive index substantially equal to the refractive index of the adhesive layer, such that the one or more base layers additionally redirect at least a portion of the longer output wavelength to at least the end of the luminescent end indicating tape. In one aspect, the one or more base layers may have an optical transmission of at least equal to about 90 percent. In another aspect, the adhesive layer may have an optical transmission of at least equal to about 90 percent. In yet another aspect, the adhesive layer may have a refractive index of at least equal to about 1.3. In other constructions, the luminescent end indicating tape may further comprise another adhesive layer having a refractive index substantially equal to the refractive index of the adhesive layer, such that the another adhesive layer redirects at least a portion of the longer output wavelength to at least the end of the luminescent end indicating tape. In further constructions, the another adhesive layer may comprise another one or more fluorescent materials that convert at least a portion of incident electromagnetic radiation to the longer output wavelength. In some instances, at least a portion of the end of the luminescent end indicating tape is detected by observing the longer output wavelength visually.

BRIEF DESCRIPTION OF THE DRAWINGS

The present teachings are illustratively shown and described in reference to the accompany drawings, in which.

DETAILED DESCRIPTION OF THE INVENTION

Figure 1:
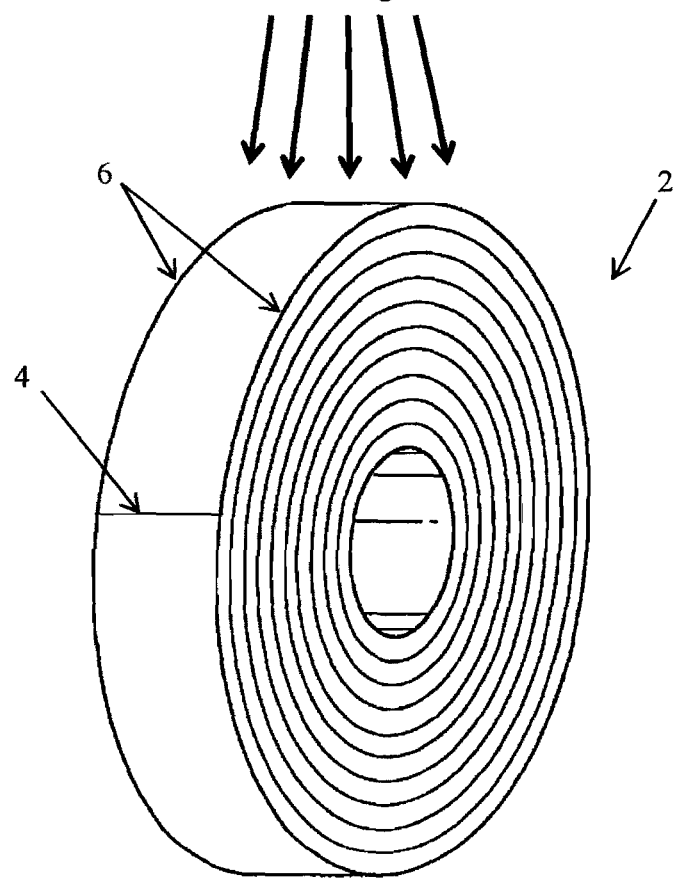
FIG. 1 is a schematic that depicts a luminescent end indicating tape, according to one aspect of these teachings.

The present teachings are directed to the creation and use of a luminescent end indicating tape that enables easy visual detection of at least the end of the tape through the use of one or more fluorescent materials incorporated into the adhesive layer of the tape.

For a better understanding of the disclosure, the following terms are herein defined:

"Luminescence" as used herein refers to the emission of electromagnetic radiation from any substance. Luminescence occurs from electronically excited states following excitation of the ground state of the substance by an energy source.

The electronic excited states of most organic molecules can be divided into singlet states and triplet states.

As used herein, the term "singlet state" refers to an electronic state wherein all electrons in the molecule are spin-paired.

The excited state is usually the first excited state. A molecule in a high vibrational level of the excited state will quickly fall to the lowest vibrational level of this state by losing energy to other molecules through collision. The molecule will also partition the excess energy to other possible modes of vibration and rotation.

"Luminescent materials" are those which exhibit luminescence, that is, emit electromagnetic radiation.

"Fluorescent materials" are those that store electromagnetic radiation and release it rapidly, generally in about $10^{-8}$ seconds or less, in a process that does not invoke a change in the electronic spin state of the molecule. Fluorescence from organic molecules typically occurs from excited singlet states.

"Incident Electromagnetic Radiation" as used herein refers to any energy source natural and/or artificial, radiating within the surrounding environment. The emission spectrum of incident electromagnetic radiation may lie within the visible and/or ultraviolet spectrum.

"Longer Output Wavelength" as used herein refers to the $\lambda_{max}$ of the emission spectrum of one or more fluorescent materials, as defined above.

As used herein, "ultraviolet electromagnetic radiation" is characterized by electromagnetic radiation with wavelengths in the region less than about 400 nanometers ("nm").

As used herein, "visible electromagnetic radiation" is characterized by electromagnetic radiation with wavelengths in the region between about 400 nanometers ("nm") and about 700 nanometers ("nm").

As used herein, "infrared electromagnetic radiation" is characterized by electromagnetic radiation with wavelengths in the region greater than about 700 nanometers ("nm").

A "layer" as used herein refers to a thin film resulting from the application and substantial drying of one or more polymeric resins and/or one or more materials that are substantially dissolved therein, or in some instances by way of extrusion, injection molding, etc.

An "adhesive layer" as used herein refers to a layer, as defined above, that can be used for adhering and/or bonding objects together, and where the layer can also be used for light piping.

An "end" as used herein refers to a preformed end or a newly formed end that runs substantially normal to the length of the tape. A newly formed end may result by way of subsequent tearing or cutting of the tape.

An "edge" as used herein refers to an outer surface of the tape that runs substantially parallel to the length of the tape.

"Optical Transmission" as used herein refers to the percent of incident electromagnetic radiation that transmits through one or more polymeric resins of a layer, as defined above.

In general, the present teachings provide for a luminescent end indicating tape comprising at least one or more base layers and an adhesive layer. The one or more base layers provide support to that of the adhesive layer, whereas the adhesive layer comprises one or more fluorescent materials. Upon the tape being exposed to incident electromagnetic radiation, the one or more fluorescent materials absorb and convert at least a portion of incident electromagnetic radiation to a longer output wavelength. The adhesive layer redirects at least a portion of the longer output wavelength to at least the end of the tape, thereby visibly illuminating the end with that of at least a portion of the longer output wavelength. In some instances, the adhesive layer may additionally redirect at least a portion of the longer output wavelength to one or more edges of the tape, such that at least a portion of longer output wavelength may also visibly illuminate the one or more edges of the tape.

FIG. 1 is a schematic illustration of one aspect of the luminescent end indicating tape 2, according to the present teachings, presented in a wound roll format. Upon exposure to incident electromagnetic radiation, the end 4 is illuminated with that of at least a portion of the longer output wavelength, thereby enabling subsequent visual detection of the end 4. In a further aspect, the one or more edges 6 may additionally be illuminated with that of at least a portion of the longer output wavelength, such that the one or more edges 6 of the tape may also be visually detected.

Figure 2:
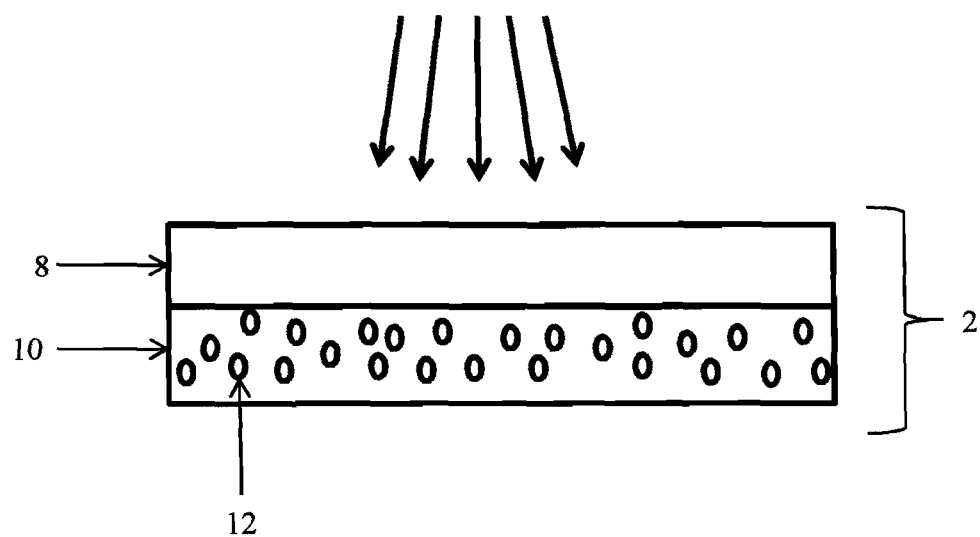
FIG. 2 is a flattened cross-sectional view of the luminescent end-edge indicating tape in FIG. 1.

FIG. 2 is a flattened cross-sectional view of the luminescent end indicating tape 2 depicted in FIG. 1. The luminescent end indicating tape 2 comprises one or more base layers 8 and an adhesive layer 10 comprising one or more fluorescent materials 12. For the purpose of this illustration, the thickness of the adhesive layer 10 is larger than the thickness of the one or more base layers 8, however any relative size is within the scope of these teachings. Still referring to FIG. 2, the one or more fluorescent materials 12 are substantially dispersed and/or substantially dissolved within the adhesive layer 10. Upon exposure to incident electromagnetic radiation, at least a portion of the incident electromagnetic radiation is transmitted through the one or more base layers 8 and the adhesive layer 10, after which the transmitted incident electromagnetic radiation is at least partially absorbed by the one or more fluorescent materials 12. The one or more fluorescent materials 12 substantially convert at least a portion of the incident electromagnetic radiation to a longer output wavelength. The adhesive layer 10 redirects at least a portion of the longer output wavelength to at least the end, 4 shown in FIG. 1, of the tape 2, such that at least a portion of the longer output wavelength egresses from at least the end, 4 shown in FIG. 1, of the tape 2, thereby resulting in illumination of the end, 4 shown in FIG. 1.

Still referring to FIG. 2, in some instances, the adhesive layer 10 may further redirect at least a portion of the longer output wavelength to the one or more edges, 6 shown in FIG. 1, such that at least a portion of the longer output wavelength also egresses from the one or more edges, 6 shown in FIG. 1, of the tape 2, thereby resulting in additional illumination of the one or more edges, 6 shown in FIG. 1. In further constructions of the luminescent end indicating tape, another one or more of the one or more base layers may be disposed onto another surface of the adhesive layer, such that the one or more base layers are rendered on both sides of the adhesive layer.

The adhesive layer redirects at least a portion of the longer output wavelength by way of light piping. Light piping is a consequence of internal reflection. Internal reflection occurs when ray of light passing through a medium reaches a boundary at which a medium of lower refractive index is encountered. In accordance with Snell's Law, the light ray will be, refracted, away from the normal to the interface. As the angle of incidence increases, a point will be reached where the ray is refracted to an angle of 90°, i.e. the light will remain in the original medium. This angle is defined as the critical angle. Rays incident to the interface at angles greater than or equal to the critical angle will be totally internally reflected causing the light to travel generally in a direction parallel to the interface.

To ensure efficient light piping of at least a portion of the emitted light, i.e. the longer output wavelength, within the adhesive layer, the adhesive layer and the one or more fluorescent materials are chosen such that, optical transmission of at least 90%, preferably 95%, exists within the adhesive layer. In addition, it is preferred that the refractive index of the adhesive layer is substantially high, preferably substantially equal to or greater than 1.3, to enable more proficient light piping, that is, the internal reflection of the longer output wavelength, as well as the illumination of at least the end of the tape. Furthermore, the desired color of the tape may also be a factor in choosing the appropriate adhesive layer and one or more fluorescent materials. It should be noted that in the instances where the refractive index of the one or more base layers, is substantially equal to the refractive index of the adhesive layer, the one or more base layers may also substantially redirect at least a portion of the longer output wavelength to at least the end of the luminescent end indicating tape by way of light piping, thereby enhancing visibility of at least the end of the tape through increasing its illumination. Moreover, in this instance, it is preferred that optical transmission of at least 90%, preferably 95%, exists within the one or more base layers.

Figure 3:
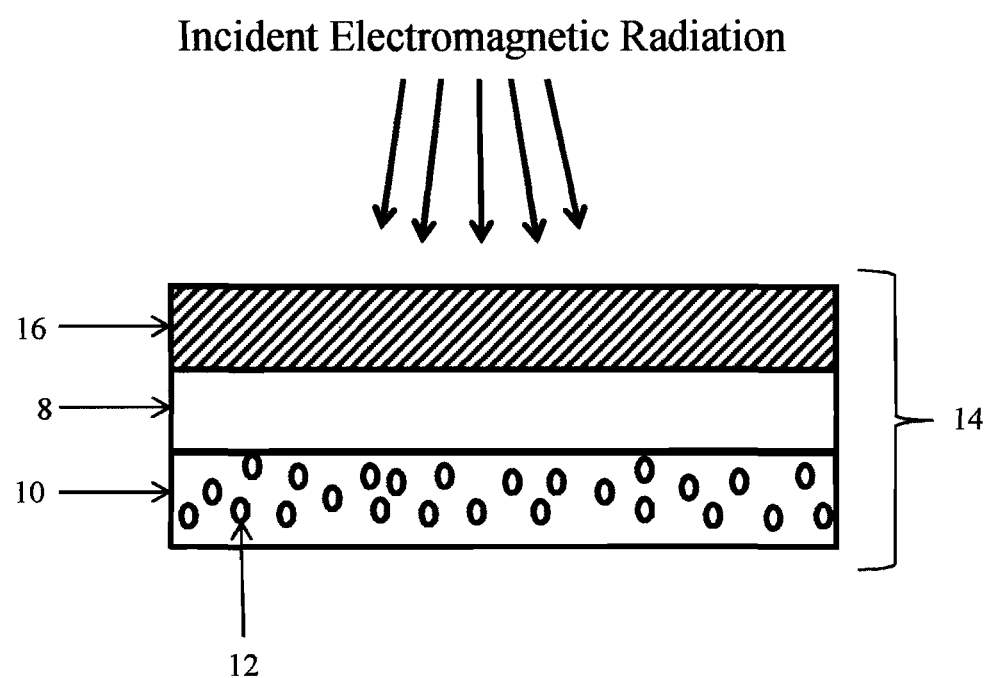
FIG. 3 is a flattened cross-sectional view of a luminescent end indicating tape, according to another aspect of these teachings.

In some instances, referring now to FIG. 3, the luminescent end indicating tape 14 may further comprise another adhesive layer 16 disposed over another side of the one or more base layers 8, thereby rendering a tape 14 having adhesive on both sides of the one or more base layers 8, i.e. a tape commonly known as double-sided tape. The another adhesive layer 16 having a refractive index substantially equal to the refractive index of the adhesive layer 10, additionally redirects at least a portion of the longer output wavelength to at least the end (not shown) of the tape 14. In a further instance, the another adhesive layer may also comprise another one or more fluorescent materials that convert at least a portion of incident electromagnetic radiation to the longer output wavelength, thus further enhancing the illumination of at least the end of the tape.

The proper concentration of the one or more fluorescent materials within the adhesive layer, or any other additional adhesive layers, is vital in order to ensure optimum emission within the luminescent end indicating tape. The proper concentration will depend on the one or more fluorescent materials, as well as the adhesive material(s) present within the adhesive layer. At too low a concentration, the one or more fluorescent materials will insufficiently emit light, i.e. the longer output wavelength, to adequately illuminate at least the end of the tape, thus making detection difficult. A maximum useful concentration value of the one or more fluorescent materials is achieved wherein the increase in emitted light reaches diminishing return, i.e. the fractional increase in emission per weight of the one or more fluorescent materials decreases. This concentration value can be determined by preparing a series of films of the adhesive layer of substantially equal thicknesses, on support bases, each film comprising a different concentration of the one or more fluorescent materials. Each film is subsequently exposed to incident electromagnetic radiation and each film emission is then measured with a fluorescence spectrophotometer and plotted vs. the concentration of the one or more fluorescent materials within the corresponding adhesive layer. At the point where the rate of increase in emission deviates from linearity, i.e. the slope of the curve decreases, the one or more fluorescent materials reached a point where further increase in emission is limited and the maximum useful concentration of the one or more fluorescent materials is thus determined.

Additionally, the amount of incident electromagnetic radiation exposed to the one or more fluorescent materials can also be important in warranting optimum emission within the luminescent end indicating tape. Thus, it is preferred that the one or more base layers, as well as the adhesive layer, and any other additional adhesive layers, be substantially transparent, so as to minimally interfere, if at all, with the one or more fluorescent materials absorption and conversion capabilities of the incident electromagnetic radiation.

A wide variety of base layer materials, preferably a thin substantially transparent support material, may be used in the present teachings, such as, but not limited to, PETG, cellophane, polyester, and vinyl.

Suitable adhesive layer materials with the appropriate refractive index and clarity useful in the present invention include, but are not limited to, functionalized butadiene-acrylics, styrene-acrylics, vinyl acrylics, acrylic lattices, polyacrylic esters, solvent borne natural rubbers, and synthetic rubbers made from at least one of styrene, isoprene, butadiene, or chloroprene.

It should be noted that the adhesive layer, or any other additional adhesive layers, may further comprise other additives. For example, surface-active agents may be incorporated within the adhesive layer to enhance proper coating, that is, prevent defects, of the adhesive materials upon the one or more base layers. Such materials should be carefully chosen, such that, they do not substantially reduce the transparency of the adhesive layer of the tape. Additionally, particularly in the instance where an aqueous latex is employed in the adhesive layer, adjustment of the pH level with fugitive materials, such as ammonia or acetic acid, may be desired to further strengthen the compatibility of the one or more fluorescent materials with that of the adhesive materials. Furthermore, in another instance, the compatibility of certain fluorescent materials, with that of the dried aqueous latex can be substantially improved with the inclusion of small amounts of low molecular weight polymers and/or ethoxylated materials, such as, but not limited to, polyethylene oxides, polyethylene oxide-propylene oxide copolymers, nonylphenol ethoxylates, and others having a strong affinity for the fluorescent material(s).

Suitable fluorescent materials useful in the present teachings include, but are not limited to, rylenes, xanthenes, porphyrins, phthalocyanines, and others with substantially high quantum yield properties. Rylene dyes include, but are not limited to, perylene ester and diimide materials, such as 3-cyanoperylene-9,10-dicarboxylic acid 2',6'-diiosopropylanilide, 3,4,9,10-perylene tetracarboxylic acid bis(2,6-diisopropyl) anilide, and 1,6,7,12-tetraphenoxy-N,N'-di(2,6-diisopropylphenyl)-3,4:9,10-perylenediimide. Xanthene dyes include, but are not limited to, Rhodamine B, Eosin Y, and fluorescein. Porphyrins include, for example, 5,10,15,20-tetraphenyl-21H,23H-tetraphenylporphine and 2,3,7,8,12,13,17,18-octaethyl-21H,23H-porphine.

The luminescent end indicating tape, according to the present teachings, may be fabricated by any method well-known to those skilled in the art. For example, one or more fluorescent materials are substantially dissolved and/or dispersed in water and subsequently combined with at least one adhesive material. This mixture is then coated on one side of the one or more base layers and substantially dried to yield a luminescent end indicating tape in accordance with one aspect of the present teachings. In a further instance, another adhesive material may then be coated on another side of the one or more base layers and substantially dried to yield a luminescent end indicating tape, according to another aspect of the present teachings. Such coating methods include, but are not limited to, slot coating, disc coating, roll coating, and bar coating. In addition, the luminescent end indicating tape may be prepared by methods such as, extrusion, injection molding, compression molding, calendaring, thermoforming, etc.

It is apparent to those skilled in the art that many additional and further aspects of the invention are possible. The present teachings are applicable to any form of tape, preferably substantially transparent tape, that is produced in a roll format, i.e. one-sided adhesive tape, double-sided adhesive tape, etc., with varying colors, widths, and/or thicknesses for various purposes.

EXEMPLIFICATIONS

The present teachings, having been generally described, will be more readily understood by reference to the following examples, which are included merely for the purposes of illustration of certain aspects and embodiments of the present teachings, and are not intended to limit the scope of these teachings.

Example 1

Preparation of a Luminescent End Indicating Tape
(Characterized as 2 in FIGS. 1 and 2)

A formulation containing 0.35 grams of a water soluble fluorescent dye, such as Direct yellow 96 Crude from Organic Dyestuffs Corporation (#1042787), and 30.0 grams of distilled water was prepared and stirred at room temperature until dye was substantially dissolved. The formulation was then placed in a dropping funnel for addition to 250.0 grams of an adhesive material, such as an aqueous acrylic adhesive latex. The adhesive material which had been previously weighed into a suitable container equipped with a motorized stirrer was stirred with only sufficient speed as to produce a very minor vortex around the agitator shaft. The formulation was then feed into the latex over approximately 20 minutes to yield an adhesive mixture. The adhesive mixture was then coated onto a surface of the base layer, such as a 1.5 mil PETG base, at a wet thickness of 5 mils and dried at 35° C. for approximately 10 minutes and then at 80° C. for an additional 20 minutes, approximately, to yield a luminescent end indicating tape comprising a base layer and an adhesive layer.

Example 2

Preparation of Luminescent End Indicating Tape
(Characterized as 14 in FIG. 3)

A formulation containing 0.35 grams of a water soluble fluorescent dye, such as Direct yellow 96 Crude from Organic Dyestuffs Corporation (#1042787), and 30.0 grams of distilled water was prepared and stirred at room temperature until dye was substantially dissolved. The formulation was then placed in a dropping funnel for addition to 250.0 grams of an adhesive material, such as an aqueous acrylic adhesive latex. The adhesive material which had been previously weighed into a suitable container equipped with a motorized stirrer was stirred with only sufficient speed as to produce a very minor vortex around the agitator shaft. The formulation was then feed into the adhesive material over approximately 20 minutes to yield an adhesive mixture. The adhesive mixture was then coated onto one surface of the base layer, such as a 1.5 mil PETG base, at a wet thickness of 5 mils and dried at 35° C. for approximately 10 minutes and then 80° C. for an additional 20 minutes, approximately. A suitable release base material is then applied to the surface of the adhesive layer for protection during the subsequent coating operation. A second adhesive material, such as an aqueous acrylic adhesive latex, was then coated onto another surface of the base layer at 5 mils wet coverage and then dried at 35° C. for approximately 10 minutes and then at 80° C. for an additional 20 minutes, approximately. The release base material was subsequently removed to yield a luminescent end indicating tape comprising a base layer, an adhesive layer, and another adhesive layer.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various aspects and embodiments, it should be realized that these teachings are also capable of a wide variety of further and other aspects and embodiments within the spirit and scope of the appended disclosure.

What is claimed is:

1. A luminescent end indicating tape, said luminescent end indicating tape comprising:
   one or more base layers, and
   an adhesive layer comprising one or more fluorescent materials that convert at least a portion of incident electromagnetic radiation to a longer output wavelength,
   wherein said adhesive layer redirects at least a portion of said longer output wavelength to at least an end of said luminescent end indicating tape, such that the end is illuminated with that of at least a portion of said longer output wavelength upon said luminescent end indicating tape being exposed to incident electromagnetic radiation, and
   wherein said one or more base layers providing support for said adhesive layer.

2. The luminescent end indicating tape of claim 1, wherein said one or more base layers being substantially transparent.

3. The luminescent end indicating tape of claim 1, wherein said adhesive layer being substantially transparent.

4. The luminescent end indicating tape of claim 1, wherein said one or more base layers having a refractive index substantially equal to the refractive index of said adhesive layer, such that said one or more base layers additionally redirect at least a portion of said longer output wavelength to at least the end of said luminescent end indicating tape.

5. The luminescent end indicating tape of claim 1, wherein said one or more base layers having optical transmission of at least equal to about 90 percent.

6. The luminescent end indicating tape of claim 1, wherein said adhesive layer having optical transmission of at least equal to about 90 percent.

7. The luminescent end indicating tape of claim 1, wherein said adhesive layer having a refractive index of at least equal to about 1.3.

8. The luminescent end indicating tape of claim 1, wherein said adhesive layer further redirects at least a portion of said longer output wavelength to one or more edges of said luminescent end indicating tape, such that the one or more edges are additionally illuminated with that of at least a portion of said longer output wavelength upon said luminescent end indicating tape being exposed to incident electromagnetic radiation.

9. The luminescent end indicating tape of claim 1, further comprising another adhesive layer having a refractive index substantially equal to the refractive index of said adhesive layer, such that said another adhesive layer redirects at least a portion of said longer output wavelength to at least the end of said luminescent end indicating tape.

10. The luminescent end indicating tape of claim 9, wherein said another adhesive layer comprises another one or more fluorescent materials that convert at least a portion of incident electromagnetic radiation to said longer output wavelength.

11. A method for fabricating a luminescent end indicating tape, said method comprising:
    providing one or more base layers, and
    overlaying an adhesive layer over one side of said one or more base layers, said adhesive layer comprising one or more fluorescent materials that convert at least a portion of incident electromagnetic radiation to a longer output wavelength, wherein said adhesive layer redirects at least a portion of said longer output wavelength to at least an end of said luminescent end indicating tape, such that the end is illuminated with that of at least a portion of said longer output wavelength upon said luminescent end indicating tape being exposed to incident electromagnetic radiation, and
    wherein said one or more base layers providing support for said adhesive layer.

12. The method of claim 11, wherein said one or more base layers having a refractive index substantially equal to the refractive index of said adhesive layer, such that said one or more base layers additionally redirect at least a portion of said longer output wavelength to at least the end of said luminescent end indicating tape.

13. The method of claim 11, wherein said one or more base layers having optical transmission at least equal to about 90 percent.

14. The method of claim 11, wherein said adhesive layer having optical transmission of at least equal to about 90 percent.

15. The method of claim 11, wherein said adhesive layer having a refractive index of at least equal to about 1.3.

16. The method of claim 11, wherein said adhesive layer further redirects at least a portion of said longer output wavelength to one or more edges of said luminescent end indicating tape, such that the one or more edges are additionally illuminated with that of at least a portion of said longer output wavelength upon said luminescent end indicating tape being exposed to incident electromagnetic radiation.

17. The method of claim 11, further comprising disposing another adhesive layer onto another side of said one or more base layers, wherein said another adhesive layer having a refractive index substantially equal to the refractive index of said adhesive layer, such that said another adhesive layer redirects at least a portion of said longer output wavelength to at least the end of said luminescent end indicating tape.

18. The method of claim 17, wherein said another adhesive layer comprises another one or more fluorescent materials that convert at least a portion of incident electromagnetic radiation to said longer output wavelength.

19. A method for identifying at least an end of a tape, said method comprising:
providing a luminescent end indicating tape, said luminescent end indicating tape comprising:
(i) one or more base layers, and
(ii) an adhesive layer comprising one or more fluorescent materials that convert at least a portion of incident electromagnetic radiation to a longer output wavelength,
wherein said luminescent end indicating tape is subsequently exposed to incident electromagnetic radiation and said adhesive layer redirects at least a portion of said longer output wavelength to at least the end of said luminescent end indicating tape, such that at least a portion of the end of said luminescent end indicating tape is detected, and
wherein said one or more base layers providing support for said adhesive layer.

20. The method of claim 19, wherein said adhesive layer further redirects at least a portion of said longer output wavelength to one or more edges of said luminescent end indicating tape, such that when said luminescent end indicating tape is subsequently exposed to incident electromagnetic radiation, at least a portion of the one or more edges are additionally illuminated with that of said longer output wavelength and detected.

21. The method of claim 19, wherein said one or more base layers having a refractive index substantially equal to the refractive index of said adhesive layer, such that said one or more base layers additionally redirect at least a portion of said longer output wavelength to at least the end of said luminescent end indicating tape.

22. The method of claim 19, wherein said one or more base layers having optical transmission of at least equal to about 90 percent.

23. The method of claim 19, wherein said adhesive layer having optical transmission of at least equal to about 90 percent.

24. The method of claim 19, wherein said adhesive layer having a refractive index of at least equal to about 1.3.

25. The method of claim 19, wherein said luminescent end indicating tape further comprises another adhesive layer having a refractive index substantially equal to the refractive index of said adhesive layer, such that said another adhesive layer redirects at least a portion of said longer output wavelength to at least the end of said luminescent end indicating tape.

26. The method of claim 25, wherein said another adhesive layer comprises another one or more fluorescent materials that convert at least a portion of incident electromagnetic radiation to said longer output wavelength.

27. The method of claim 19, wherein said at least a portion is detected by observing said longer output wavelength visually.

* * * * *